Dec. 12, 1967     C. A. PETERSON     3,357,662

HOLDER FOR CAMPAIGN BUTTONS, FLAGS AND THE LIKE

Filed Feb. 15, 1966

Charles A. Peterson
INVENTOR.

BY *Clarence A. O'Brien*
and *Harvey B. Jacobson*
Attorneys

United States Patent Office 3,357,662
Patented Dec. 12, 1967

3,357,662
HOLDER FOR CAMPAIGN BUTTONS, FLAGS AND THE LIKE
Charles A. Peterson, Brainerd, Minn., assignor to Pan American Sulphur Company, Houston, Tex., a corporation of Delaware
Filed Feb. 15, 1966, Ser. No. 527,548
3 Claims. (Cl. 248—39)

ABSTRACT OF THE DISCLOSURE

The holder shown has to do with a simple plastic or an equivalent bracket characterized by self-contained facilities for supporting and displaying pennants, flags, ornamentally attractive political campaign buttons, self-identifying emblematic and symbolic badges and the like. It comprises a plate whose rearward side is constructed to permit the attachment thereto of a button or emblem. This plate is provided on its opposite or forward side with upper and lower pairs of apertured lugs which are arranged to accommodatingly support the staff of a flag or pennant. Means is provided at the bottom to provide a flanged adapter capable of attachment, if desired, to a marginal edge portion of a trunk lid.

---

The present invention relates to readily attachable and detachable automotive accessories such as are expressly designed and adapted for occasional use when the driver or other occupant of the vehicle feels called upon to display a pennant, badge or the like and has to do with a special purpose holder which is expressly, but not necessarily, designed and adapted to effectually hold and display attractive pennant-type flags, ornamental campaign buttons, badges and the like.

The custom of presenting and displaying emblems, insignia, symbolic badges, buttons, flags and the like calls for the use of many and varied styles and forms of so-called pennant and flag holders for automobile use. An object of the present invention is to structurally, functionally and in other ways improve upon prior art holders and accessories and, in so doing, to advance this line of endeavor. To the ends desired, the present concept has to do with a holder which is characterized, generally speaking, by a simple, practical and economical bracket, more particularly, a bracket which is capable of efficient and reliable use on a marginal edge portion of a vehicle door, for example, the door or lid of a trunk such as is customarily incorporated in present day automobiles.

The herein disclosed readily attachable and detachable bracket can be aptly used to support signs, ornaments and many display items in this general field of endeavor. It will simplify the presentation here to construe the bracket as one which is applicable to the leading edge of the lid of an automobile trunk and which is such in adaptability that it functions to adequately accommodate a campaign button or badge on the rear side of the bracket and the staff portions of pennants or flags on the front side.

More specifically, novelty is predicated on a trunk lid bracket which is characterized by a plate fashioned from a suitable grade of commercial plastics, or the like, said plate being unique in that the lower portion thereof is provided on the rear side with a pair of outstanding flanges and on the forward or front side with a single outstanding flange. The upper and lower rearward flanges provide an adapter which accommodatingly straddles the leading edge of the trunk lid. The forwardly directed flange overlies and resides flatwise atop a marginal portion of the trunk deck and is in a plane relative to the plane of the uppermost flange on the rear side to provide the adaptability required for occasional but ready use of the bracket.

Further novelty is predicated on the specially flanged bracket wherein the plate is of simple construction and provided with struck-out lugs, said lugs being apertured to provide ears and properly arranged and paired to serve as keepers for staff portions of the attachable and detachable pennant-type flags.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
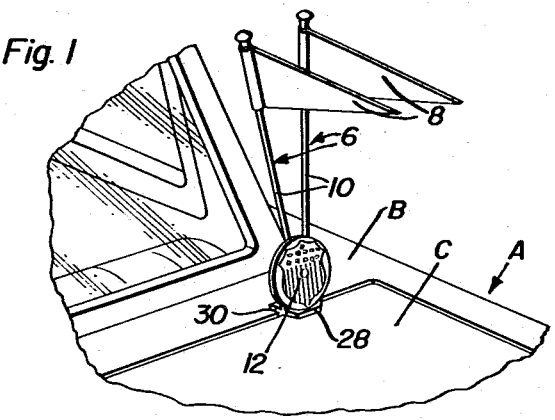
FIGURE 1 is a fragmentary view showing the forward righthand corner portion of an automobile trunk and illustrating, what is more important, the improved holder or bracket and how it is constructed and used in conjunction with the trunk lid and forward encompassing portion of the trunk deck.
Figure 4:
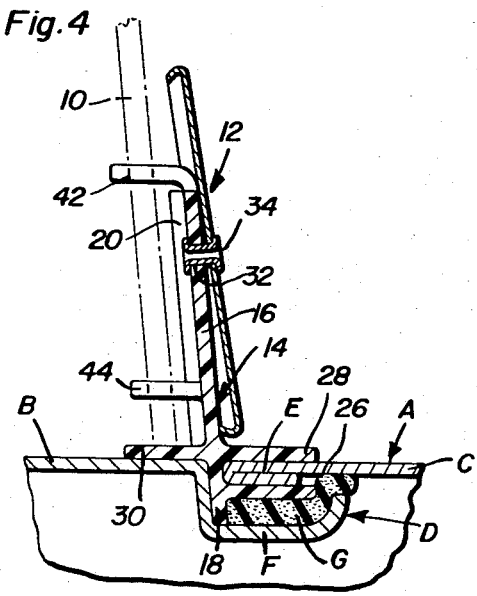
FIGURE 4 is an enlarged view primarily in section but with parts in elevation showing the adapter means at the bottom of the bracket and how it is cooperable with the trunk lid, the channeled ledge on the trunk deck and weatherstripping means, whereby to provide a satisfactory mounting without interfering with lid seal.

Referring now to FIGS. 1 and 4, the letter A designates the rear end of a conventional-type automobile wherein the front marginal component of the deck is denoted at B and the hinged openable and closable lid or cover at C. With reference in particular to FIG. 4 it will be evident that the marginal edge portion of the relatively stationary deck is provided, as usual, with an encompassing or surrounding limit stop D which is sometimes referred to as a weatherproofing ledge for the lip portion of the lid or cover, particularly the leading edge E as shown in FIG. 4. The ledge or flange is channel-shaped in cross-section as at F and contains the compressibly resilient weatherstrip G. These are all old parts and have been shown and described to bring out the fact that the adapter means on the unique bracket is such that it fits well into place to coact with existing or stock parts and therefore well serves the purposes for which the invention is intended.

With reference now to the essence of the invention it will be seen that the concept, broadly speaking, pertains to a holder for flags and a badge, button or equivalent means. The flags are denoted by the numeral 6 in FIG. 1, for example, and each comprises a suitable triangular or equivalent pennant 8 having a staff 10 for reception and retention in keeper means provided therefor. The badge or button is provided at 12 and comprises a suitable plastic relatively large and easy-to-see disk-like badge whose display side is provided with a message, a picture of the candidate, or whatever ornamental media is suitable and fitting for the occasion during which the badge is to be paraded about on the trunk of the automobile.

The holder, more specifically comprises a one-piece plastic bracket which is denoted at 14 and is characterized by a substantially rectangular plate 16 having a lower edge 18, marginally flanged vertical edges 20 and an upper marginal edge 22. The trunk lid adapter means comprises a pair of companion flanges. The upper or outer flange corresponds in shape to and is spaced above the inner or lower flange 26. As shown in the assembly view in FIG. 4 the flange 26 fits into the channel and compresses the rubber or equivalent packing strip G. Both flanges straddle the leading edge E. The outer or upper flange 28 resides flatwise atop the leading edge portion. The companion and complemental forwardly directed integral flange 30 is in a plane common with the plane of the flange 28 and it projects laterally from the plate and is in a position to reside firmly and flatwise atop the deck portion of the trunk. The central or median portion of the plate is provided with a hole as at 32 (see FIG. 2) which serves to accommodate a hollow rivet with peened ends, said rivet being denoted generally at 34 in FIG. 4 and passing through and serving to hold in place the disk-like campaign button or badge 12. The plate portion is also provided with a plurality of struck-out tongues or lugs. These lugs are arranged in pairs. One set or pair of lugs is shown at the left in FIG. 3 wherein the upper and lower paired lugs are denoted at 36 and 38. These lugs are offset relative to each other so as to accommodate the diagonally positioned staff of the pennant or flag. These lugs are provided with holes 40 which are intentionally disaligned to accommodate the staff 10. The struck-out lugs at the right are conveniently denoted at 42 and 44 and are also provided with keeper holes 46 also slightly out of line relative to each other to accommodate the pennant staff in the manner and for the purposes already described. It follows that a simple moldable plastic plate (made from polypropylene or an equivalent plastic material) provides the durable and tensile strength properties desired.

It will be noted that the lugs or ears 36 and 42 are at the upper edge 22, that the lower lugs or ears 38 and 44 are in the body portion below the hole 32 and above the flanges 28 and 30. This orientation and coordination of component parts provides a simple economical and highly practical bracket, one which can be readily applied and removed and which well serves the particular purposes for which it has been devised.

Figure 2:
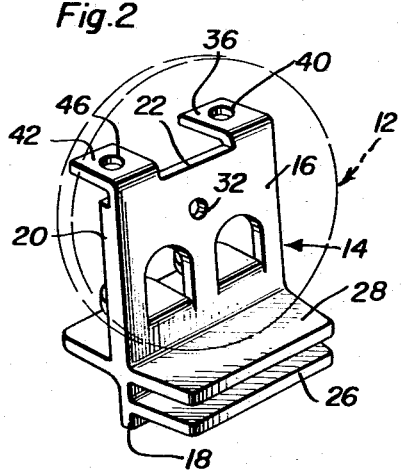
FIGURE 2 is a view in perspective of the holder or bracket by itself with the campaign button or badge appearing in phantom lines.
Figure 3:
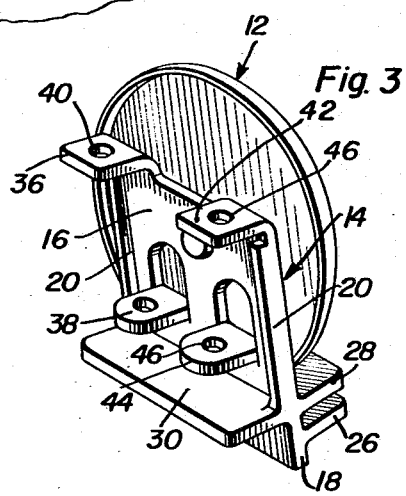
FIGURE 3 is a view also in perspective but observing the forward or face side of the bracket and also showing the button attached in full lines.
Figure 5:
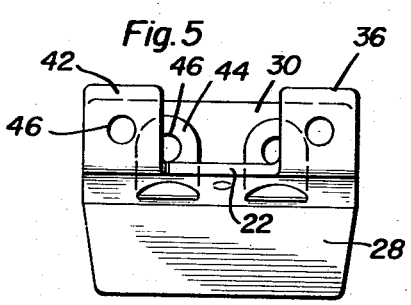
FIGURE 5 is a top plan view of the bracket by itself.

It is clear from FIGS. 2, 3 and 5 what the simple plastic bracket looks like. The general appearance of the bracket when in place and in use is revealed in FIG. 1. The manner in which the flanges coordinate with the existing or stock parts of the trunk, for example, the components B and C is evident from FIG. 4. While the invention shown in use on the door or lid of the trunk it will be understood that it can also be used on the edge of body doors and will cooperate with the frame and door in the manner which should be evident, it is believed, from FIG. 4.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. As a new article of manufacture, a bracket for temporarily supporting and displaying pennants, flags, ornamentally attractive political campaign buttons, self-identifying emblematic and symbolic badges and the like comprising a plate having means on one vertical side for holding and presenting a button or the like, having means on an opposite vertical side to hold and support the staff of a pennant-type flag, and having means at a bottom portion to retentively mount said plate on a marginal edge of a trunk lid, said first named means comprising a rivet and an accommodation hole for said rivet formed in a central areal portion of said plate, said second-named means comprising centrally apertured ear-like lugs struck out from said plate and laterally bent and paired for use, the means at the bottom of said plate comprising a pair of duplicate flanges disposed in spaced parallel relationship and projecting rearwardly at right angles from said plate and defining and providing an adapter and a third flange projecting forwardly at right angles from said plate and disposed in a plane below said lugs.

2. A bracket for temporarily supporting and displaying pennants, flags, campaign buttons, emblems and the like comprising: a plate having forward and rearward sides and embodying upper and lower horizontal marginal edges and vertical marginal edges, said upper marginal edge being provided with a first pair of coplanar rearwardly projecting lugs each having a flagstaff hole, the median body portion of said plate having a second pair of lugs disposed in a plane with each other and in a plane below the plane of the lugs of said first pair of lugs and also having flagstaff holes, the lower edge portion of the forward side of said plate being provided with lateral forwardly projecting horizontal flanges providing an upper flange and a companion lower flange, said flanges being spaced apart in parallel relation and coacting in providing an adapter, and said lower edge portion being also provided on its rearward side with a third horizontal laterally projecting limit stop flange which is disposed in a plane corresponding to the plane of said upper flange and is spaced below and underlies the lugs of said second pair of lugs and provides a ledge-like rest for the lower ends of the flagstaffs.

3. The bracket defined in claim 2, and wherein said bracket is made of one-piece from moldable plastic material, said plate being rectangular in rear elevation, said first named lugs being spaced apart and located at the respective upper and lower corner portions of the plate and generally in line with the coacting upper margin edge, said second mentioned lugs being struck out, said upper and lower flanges being commensurate in length with the width dimension of said plate.

References Cited

UNITED STATES PATENTS

| | | | |
|---|---|---|---|
| 1,296,866 | 3/1919 | Skretting | 248—43 |
| 1,744,196 | 1/1930 | Ames | 248—43 X |
| 2,177,513 | 10/1939 | Beard | 248—39 |
| 2,298,744 | 10/1942 | Liermann | 248—39 |
| 2,445,606 | 7/1948 | Davis | 248—226.5 |

JOHN PETO, *Primary Examiner.*

UNITED STATES PATENT OFFICE

CERTIFICATE OF CORRECTION

Patent No. 3,357,662      December 12, 1967

Charles A. Peterson

It is hereby certified that error appears in the above numbered patent requiring correction and that the said Letters Patent should read as corrected below.

In the heading to the printed specification, lines 4 to 6, for "Charles A. Peterson, Brainerd, Minn., assignor to Pan American Sulphur Company, Houston, Tex., a corporation of Delaware" read -- Charles A. Peterson, P. O. Box 607, Brainerd, Minn. --.

Signed and sealed this 18th day of March 1969.

(SEAL)
Attest:

Edward M. Fletcher, Jr.      EDWARD J. BRENNER
Attesting Officer        Commissioner of Patents